(12) United States Patent
Guger et al.

(10) Patent No.: US 12,433,523 B2
(45) Date of Patent: Oct. 7, 2025

(54) ELECTRODE ARRANGEMENT FOR MEASURING ELECTRIC VOLTAGES

(71) Applicants: Christoph Guger, Piberbach (AT); Guenter Edlinger, Granz (AT)

(72) Inventors: Christoph Guger, Piberbach (AT); Guenter Edlinger, Granz (AT)

(*) Notice: Subject to any disclaimer, the term of this patent is extended or adjusted under 35 U.S.C. 154(b) by 952 days.

(21) Appl. No.: 17/621,819

(22) PCT Filed: Jun. 18, 2020

(86) PCT No.: PCT/AT2020/060247
§ 371 (c)(1),
(2) Date: Dec. 22, 2021

(87) PCT Pub. No.: WO2020/257836
PCT Pub. Date: Dec. 30, 2020

(65) Prior Publication Data
US 2022/0240827 A1   Aug. 4, 2022

(30) Foreign Application Priority Data
Jun. 26, 2019 (AT) .............................. A 50572/2019

(51) Int. Cl.
*A61B 5/268* (2021.01)
*A61B 5/00* (2006.01)
(Continued)

(52) U.S. Cl.
CPC .............. *A61B 5/268* (2021.01); *A61B 5/257* (2021.01); *A61B 5/266* (2021.01); *A61B 5/291* (2021.01); *A61B 5/30* (2021.01); *A61B 5/304* (2021.01); *A61B 5/6814* (2013.01); *A61B 5/6823* (2013.01); *A61B 5/6829* (2013.01);
(Continued)

(58) Field of Classification Search
CPC ......... A61B 5/257; A61B 5/266; A61B 5/268; A61B 5/291; A61B 5/30; A61B 5/304; A61B 5/6814; A61B 5/6823; A61B 5/6829; A61B 5/6832; A61B 2562/043; A61B 2562/046; A61B 2562/164; A61B 2562/166
See application file for complete search history.

(56) References Cited

U.S. PATENT DOCUMENTS

| | | | |
|---|---|---|---|
| 6,047,206 A | * | 4/2000 | Albrecht ................ A61B 5/349 600/509 |
| 9,731,108 B2 | | 8/2017 | Mathew et al. |

(Continued)

FOREIGN PATENT DOCUMENTS

WO         9802090 A1     1/1998

*Primary Examiner* — Linda C Dvorak
*Assistant Examiner* — Bradford C. Blaise
(74) *Attorney, Agent, or Firm* — Laurence A. Greenberg; Werner H. Stemer; Ralph E. Locher (57) ABSTRACT

An electrode arrangement measures electric voltages and currents in the human body and provides electro-simulation of the human body. The electrode arrangement contains an electrode array with a flexible support. A number of electrodes are arranged in a grid on the same side of the support and slots are disposed between the individual electrodes starting from the outer edge of the support. An elastic intermediate layer that has one recess for each electrode is provided, each recess defining a cavity to be filled with an electrically conductive gel.

19 Claims, 4 Drawing Sheets

(51) Int. Cl.
    *A61B 5/257*     (2021.01)
    *A61B 5/266*     (2021.01)
    *A61B 5/291*     (2021.01)
    *A61B 5/30*     (2021.01)
    *A61B 5/304*     (2021.01)

(52) U.S. Cl.
    CPC ..... *A61B 2503/12* (2013.01); *A61B 2562/046* (2013.01); *A61B 2562/164* (2013.01); *A61B 2562/166* (2013.01)

(56) References Cited

U.S. PATENT DOCUMENTS

| | | | |
|---|---|---|---|
| 2003/0225323 A1* | 12/2003 | Kiani | A61B 5/291 600/323 |
| 2016/0120432 A1* | 5/2016 | Sridhar | A61B 5/6898 600/544 |
| 2016/0150992 A1* | 6/2016 | Lee | A61N 1/0484 607/45 |
| 2016/0228691 A1* | 8/2016 | Mathew | A61N 1/0496 |
| 2017/0086686 A1 | 3/2017 | Narasimhan et al. | |
| 2017/0128015 A1 | 5/2017 | Rogers et al. | |

\* cited by examiner

ELECTRODE ARRANGEMENT FOR MEASURING ELECTRIC VOLTAGES

FIELD AND BACKGROUND OF THE INVENTION

The invention relates to an electrode arrangement for measuring electrical voltages and currents in the human body and for electrical stimulation of the human body, in accordance with the independent electrode arrangement claim, and to a method for applying an electrode arrangement to a body surface of the human body, in accordance with the independent method claim.

A wide variety of electrode arrangements for measuring brain activity or cardiac activity are known from the prior art, in particular from the medical field. Known electrode arrangements of this type include, for example, dry electrodes or electrodes which, for example with the aid of electrically conductive gel or electrically conductive liquids, establish contact with the body surface of a test subject such that electrical signals can be detected inside the body of the test subject. With all electrode arrangements, however, perfect measurement results require correct positioning of the electrodes, good fixing or a good hold on the body part that is to be measured, and perfect electrical contact between the electrodes and the body surface. Perfect contact of this kind and good fixing are difficult to achieve, in particular on curved body surfaces such as the head of a test subject. Furthermore, particularly in the field of electroencephalography, it is desirable to make a high electrode density available per unit area of the body surface to be examined, so as to be able to ensure the best possible spatial resolution of the EEG measurement data, for example to be able to locate activities in certain regions of the brain. However, since the individual electrodes in known electrode arrangements often have to be put in place individually, the positioning of a large number of electrodes on the body surface of the test subject is very time-consuming.

SUMMARY OF THE INVENTION

The problem addressed by the invention is therefore to make available an electrode arrangement which remedies this situation and allows a large number of electrodes to be easily placed even on curved body surfaces.

The invention solves this problem with an electrode arrangement for measuring electrical voltages and currents in the human body and for electrical stimulation of the human body, in accordance with the independent electrode arrangement claim. According to the invention, provision is made that the electrode arrangement comprises
- an electrode array with a flexible carrier, wherein a number of electrodes are arranged in a grid-like formation on the same side of the carrier, and wherein slits starting from the outer edge of the carrier are arranged between the individual electrodes, and
- an elastic intermediate layer which, for each of the electrodes, has a respective recess, wherein a cavity for filling with electrically conductive gel is in each case predefined by each recess.

An electrode arrangement configured in this way advantageously allows a large number of electrodes to be applied to the body surface of a test subject at the same time and in one work step, since the electrodes are arranged contiguously in the form of an electrode array. A perfect conductive contact to the body surface of the test subject is advantageously ensured by the fact that a gel for producing a conductive connection to the body surface is present in the recesses for each individual electrode. The slits in the carrier, which engage between the individual electrodes, also allow the electrode array to be easily adapted to, or the electrode arrangement to be placed on, curved body surfaces.

In order to ensure particularly rapid fitting of the electrode arrangement to the body surface of a test subject, provision can be made that the elastic intermediate layer has a first adhesive surface for arrangement on the body surface of a test subject and/or a second adhesive surface for arrangement on the carrier of the electrode array.

Particularly good adaptation of the elastic intermediate layer to the widest variety of differently shaped body surfaces, at the same time with low production costs, can be achieved if the elastic intermediate layer is formed from a flexible electrically insulating material, in particular a foamed plastic.

To reduce the contact resistance and the contact voltage, provision can be made that the electrodes of the electrode array are highly conductive and in particular are composed of gold, platinum, electrically conductive polymer or another electrode material.

A carrier that is particularly easy to produce, even for a large number of electrodes, can be made available if the carrier of the electrode array is designed as a flexible printed circuit board, in particular as a flex print.

A particularly versatile use of the electrode arrangement for measuring electrical voltages and currents in the human body, but also for electrical stimulation of the human body, can be achieved if the electrode array is designed for arrangement on a foot and/or on the chest and/or on the heart.

Particularly reliable fixing of the electrode arrangement to a wide variety of body surfaces can be achieved if the slits between the individual electrodes of the electrode array are designed in such a way that the electrode array can be arranged on a curved body surface, in particular on the head of a test subject.

A particularly reliable measurement result can be achieved if an amplifier arrangement arranged on the carrier is provided, wherein the electrodes are connected to the amplifier arrangement, and wherein provision is made in particular that the amplifier arrangement is arranged at a distance of less than 100 mm, in particular in the range below 10 mm, from the nearest electrode of the electrode array. By arranging the amplifier arrangement on the carrier of the electrode arrangement, it can be ensured that no disruptive influences falsify the measurement result, since, particularly in the case of small electrodes, a large impedance can occur that can falsify the measurement result.

A particularly simple change-over from a measurement of electrical currents or voltages in the human body to an electrical stimulation of the human body can be ensured by a switching unit connected to the electrode array, wherein the switching unit is designed to switch between an electrical stimulation of the human body via the electrodes and a measurement of electrical voltages and currents in the human body by means of the electrodes.

An electrode arrangement to be applied particularly rapidly can be made available if the cavities are filled with electrically conductive gel, in particular when the electrode arrangement is arranged on the body surface of a test subject.

A design variant of the intermediate layer that uses particularly less material can be made available if the elastic intermediate layer is covered by the carrier of the electrode array, in particular when the electrode arrangement is arranged on the body surface of a test subject.

A particularly easy-to-clean design variant of an electrode arrangement, which at the same time ensures particularly good electrically conductive contact between the electrodes and a body surface of the human body, can be made available if a retaining layer is provided between the elastic intermediate layer and the electrodes of the electrode array,
wherein the retaining layer has a smaller cross-sectional area than the elastic intermediate layer, and
wherein the retaining layer has contact openings,
wherein the contact openings have a smaller cross-sectional area than the recesses of the intermediate layer and
wherein the contact openings, in particular when the electrode arrangement is arranged on the body surface of a test subject, correspond with the recesses in such a way that an electrically conductive connection can be produced between the electrodes and the cavities, in particular between the electrodes and an electrically conductive gel present in the cavities.

A further problem addressed by the invention is to make available a method for applying an electrode arrangement to a body surface of the human body. The invention solves this problem with a method according to the independent method claim. According to the invention, provision is made that
a) the second adhesive surface of the intermediate layer is arranged on the carrier of the electrode array in such a way that the electrodes correspond with the recesses in the intermediate layer,
b) electrically conductive gel is applied to that side of the intermediate layer facing away from the carrier of the electrode array, in such a way that the cavities predefined by the recesses are completely filled, wherein in particular provision is made that excess gel is removed, and
c) the first adhesive surface of the intermediate layer is arranged on a body surface of the human body.

A method according to the invention can advantageously also be carried out in the reverse order.

Further advantages and embodiments of the invention will become clear from the description and the accompanying drawings.

Particularly advantageous but non-limiting exemplary embodiments of the invention are depicted schematically in the accompanying drawings and are described by way of example with reference to the drawings.

DETAILED DESCRIPTION OF THE INVENTION

Figure 1:
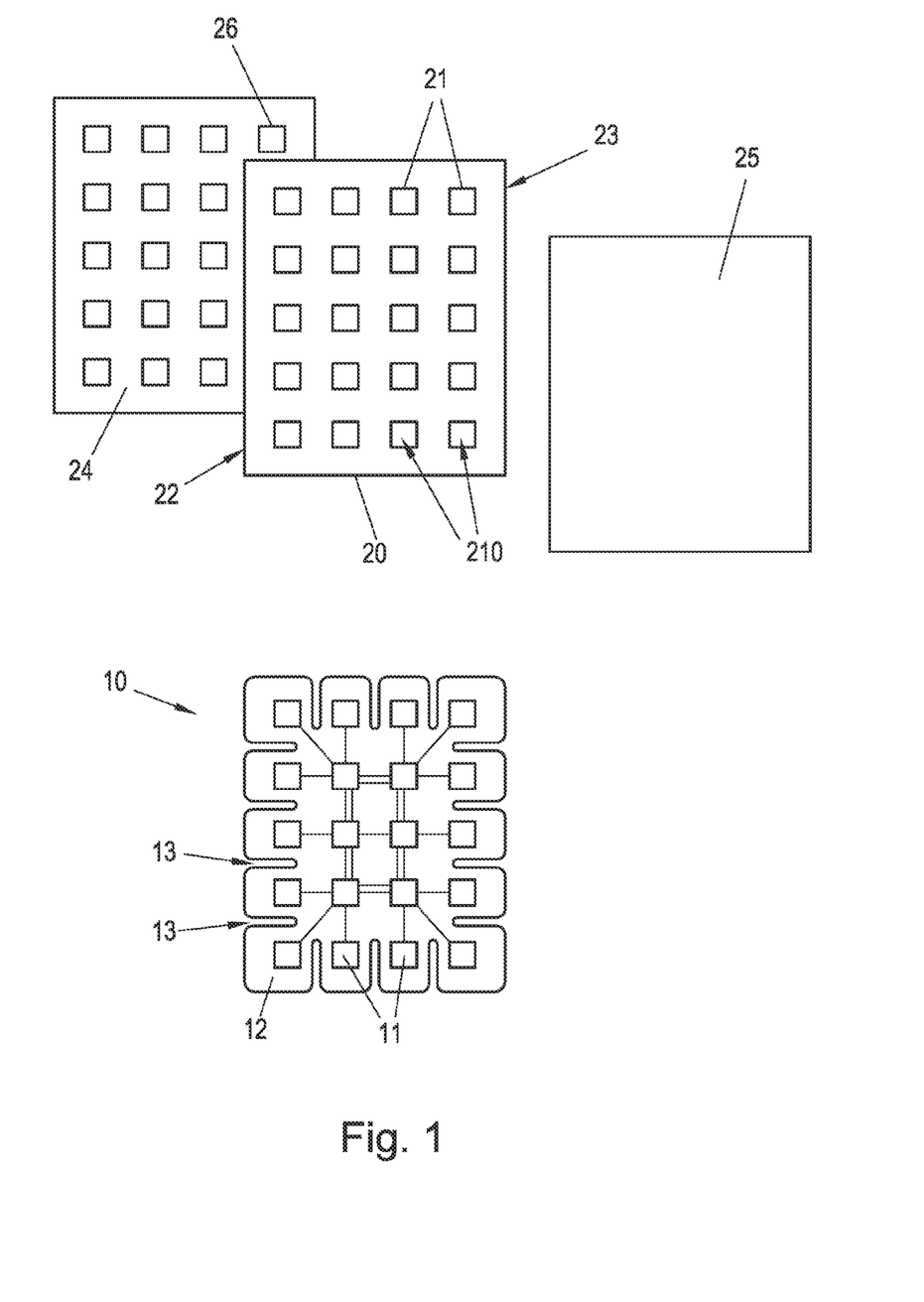
FIG. 1 shows a first exemplary embodiment of an electrode arrangement according to the invention.

FIG. 1 shows a first exemplary embodiment of an electrode arrangement 100 according to the invention. The electrode arrangement 100 comprises an electrode array 10 with a flexible, i.e. elastic, bendable carrier 12, wherein the electrodes 11 of the electrode array 10 are arranged on the flexible carrier 12. In the first exemplary embodiment, the electrodes 11 are rectangular and are arranged in a grid-like formation on the same side of the carrier 12 and distributed equidistantly. However, such an arrangement of the electrodes 11 is by no means essential to the functioning of the invention, and other arrangements are also possible, for example in the form of concentric circles or with a varying distance between the electrodes 11. Optionally, the electrodes 11 can also have, for example, a circular cross-sectional area.

In the first exemplary embodiment in FIG. 1, the carrier 12 is a flexible printed circuit board, also known as a flex print. A flexible printed circuit board of this kind is a substrate, for example of polyimide, with a thickness of less than 200 µm for example, which can be cut to any desired shape and size. The conductor tracks can be produced from copper for example, can have a thickness of 28 µm for example, and can also be present on both sides of the carrier 12.

In the exemplary embodiment shown in FIG. 1, the electrodes 11 arranged on the carrier 12 are highly conductive and are produced from gold, although they can also be made of platinum or conductive polymer or another known electrode material. Furthermore, as an alternative to this, the electrodes 11 can be formed, for example, from nickel coated with a gold layer of, for example, 0.03 µm. The substrate of the carrier 12 can, for example, also have cover layers applied thereon, such as epoxy resin or an additional polyimide layer, which are applied in the regions between the electrodes 11. The maximum thickness of the electrode array 10 with the flexible carrier 12 and the electrodes 11 can be less than 1 mm, for example.

In the exemplary embodiment in FIG. 1, twenty electrodes 11 are arranged in five lines and four columns. In the first exemplary embodiment in FIG. 1, the electrodes 11 have a size of 2 by 2 mm and are arranged equidistantly on a carrier 12 measuring 5 by 5 cm. However, the size of the carrier 12, and also the number of electrodes 11 arranged on the carrier 12, can also be chosen differently. Exemplary embodiments of such electrode arrays 10 having a varying number of electrodes 11 are shown in FIG. 3 to FIG. 7, as will be discussed in greater detail below.

Between the electrodes 11 arranged in a grid-like formation on the carrier 12, slits 13 starting from the outer edge of the carrier 12 are arranged between the individual electrodes. In the exemplary embodiment shown, the slits 13 extend through the outermost row of electrodes 11, as viewed from the edge of the carrier 12. However, this is by no means absolutely necessary, and the slits 13 can be chosen to be shorter, although, depending on the size of the carrier 12, they can also extend for example through two or more rows of electrodes. These slits 13 advantageously ensure that the carrier 12, designed as a flexible printed circuit board, can adapt to the body surface of a test subject 1, such that an electrode arrangement 100 of this kind can also be applied to curved body surfaces, as is shown for the head 2 of a test subject 1 in FIG. 2.

However, an electrode arrangement 100 according to the invention can also be arranged on a foot, on the chest or on the heart. The dimensions of the carrier 10 and of the intermediate layer 20, and the length of the slits 13, are in this case adapted for the arrangement on the respective body surface.

As can also be seen in FIG. 1, an electrode arrangement 100 according to the invention comprises an elastic intermediate layer 20 which, for each of the electrodes 11 of the electrode array 10, has a respective recess 21. The individual recesses 21 of the elastic intermediate layer 20 are filled or can be filled with gel for producing a conductive connection to the body surface of the human body.

Figure 2:
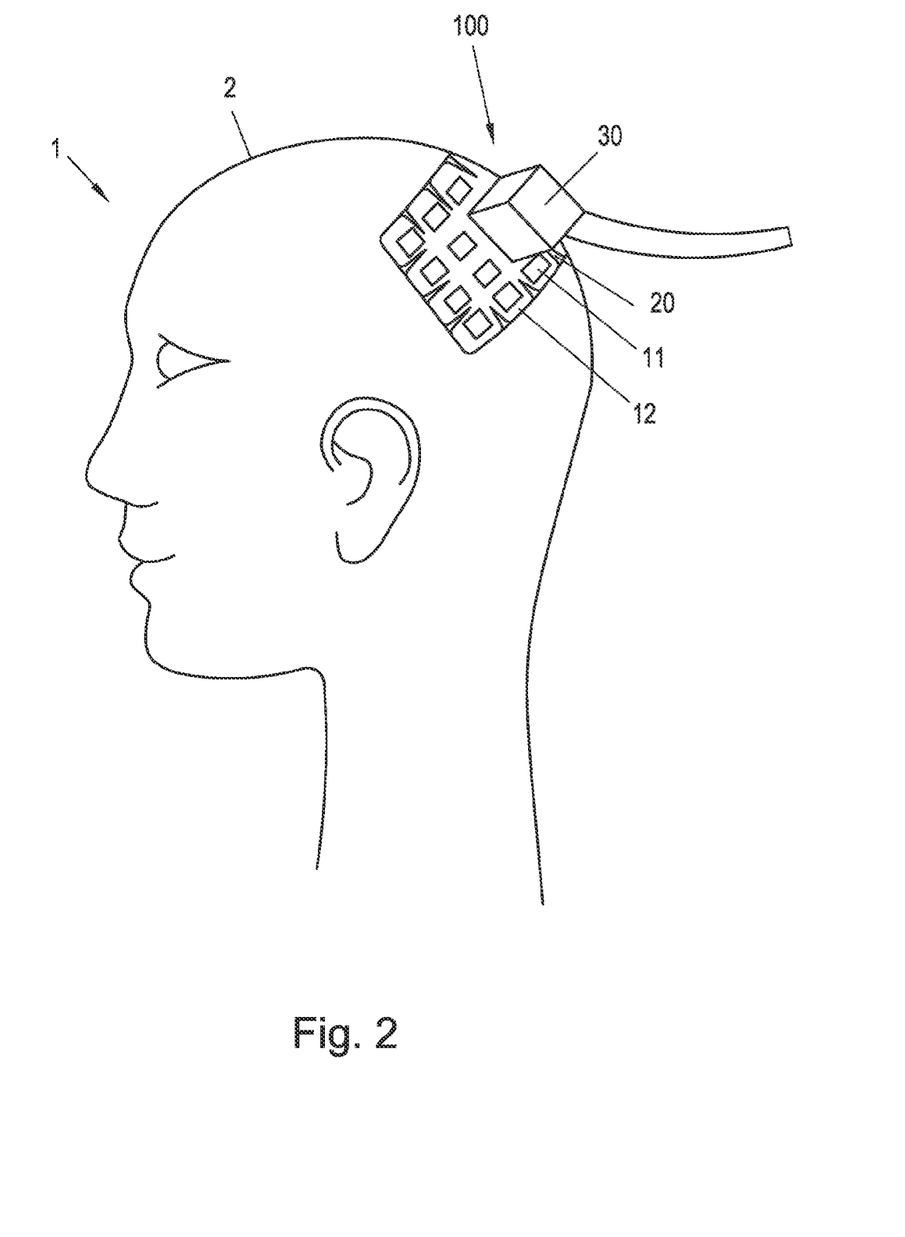
FIG. 2 shows the electrode arrangement from FIG. 1 when arranged on the head of a test subject.

When the electrode arrangement 100, as shown in FIG. 2, is arranged on the body surface of a test subject 1, the carrier 12 of the electrode array 10 covers the elastic intermediate layer 20. In the first exemplary embodiment, the elastic intermediate layer 20 is formed from a flexible, foamed and electrically insulating material (in FIG. 1 this is a plastic) and has a first adhesive surface 22 for arrangement on the body surface of a test subject 1, and a second adhesive surface 23 for arrangement on the carrier 12 of the electrode array 10.

The intermediate layer 20 can be, for example, a skin-friendly double-sided adhesive tape, which has a thickness of about 1700 μm, for example. The recesses 21 for the electrodes 11 can be produced in the intermediate layer 20 by punching or laser cutting, for example. The recesses 21 can have the same size as the electrodes 11 or can be slightly larger such that the contact area between the conductive gel and the body surface or the skin of the test subject 1 is maximized, and at the same time the distance between the recesses 21 is large enough to avoid an electrical short circuit.

Cavities 210, which are predefined by the recesses 21, can be filled with electrically conductive gel in order to establish the best possible electrical contact with the body surface. The volume of such a cavity 210 is defined by the cross-sectional area of the respective recess 21 and the thickness of the intermediate layer 20.

A method according to the invention for applying an electrode arrangement 100 according to the invention to the body surface of a test subject 1 will now be described below. As can be seen from FIG. 1, the intermediate layer 20 in the first exemplary embodiment in a starting state, i.e. before being arranged on the body surface of the test subject 1, initially has a first cover layer 24 which has openings 26 that correspond with the recesses 21 in the intermediate layer 20. The first cover layer 24 covers the first adhesive surface 22 of the intermediate layer 20, with which the intermediate layer 20 is arranged on the body surface of a test subject 1, for example on the head 2 of the test subject 1, as is shown in FIG. 2.

The first cover layer 24 protects the first adhesive surface 22 from soiling that could impair the adhesive effect.

As can also be seen from FIG. 1, the elastic intermediate layer 20 in the first exemplary embodiment has, in the starting state, a second, closed cover layer 25, which covers the second adhesive surface 23 with which the intermediate layer 20 is arranged on the carrier 12 of the electrode array 10. This serves to protect the second adhesive surface 23 from soiling.

In a method according to the invention for applying an electrode arrangement 100 to a body surface of the human body, the second adhesive surface 23 of the intermediate layer 20 is firstly arranged on the carrier 12 of the electrode array 10 in such a way that the electrodes 11 correspond with the recesses 21 in the intermediate layer 20, such that electrical voltages or currents can be measured through the recesses 21. If the second adhesive surface 23 of the intermediate layer 20 is covered by a second cover layer 25, the latter is firstly pulled off in order to establish the connection between the intermediate layer 20 and the carrier 12 of the electrode array 10.

Thereafter, electrically conductive gel is applied to that side of the intermediate layer 20 facing away from the carrier 12 of the electrode array 10, in such a way that the cavities 210 predefined by the recesses 21 are completely filled, and excess gel is then removed, for example with a card.

Then, if it is present, the first cover layer 24 which covers the first adhesive surface 22 of the intermediate layer 20, and in which the openings 26 corresponding with the recesses 21 in the intermediate layer 20 are arranged, is pulled off. This ensures that the electrically conductive gel is present exclusively in the recesses 21, such that electrical short circuits between the electrodes 11 are avoided.

Thereafter, the intermediate layer 20 is arranged with the first adhesive surface 22 on the body surface of the test subject 1, as is shown in FIG. 2. In order to ensure the best possible fixing and a good contact between the electrodes 11 and the body surface, it is advantageous if the skin of the test subject 1 is free of hair and loose scales. Further preparation of the skin, for example with abrasive gel or alcohol, as is required for electrode arrangements known from the prior art, is advantageously not required in the case of an electrode arrangement 100 according to the invention.

In this way, rapid fitting of a large number of electrodes 11 can be achieved, since they are arranged together on the carrier 10 and, moreover, the electrically conductive gel does not have to be introduced separately into each recess 21.

A method according to the invention for applying an electrode arrangement can advantageously also be carried out in the reverse order, i.e. the intermediate layer 20 is firstly placed on the body surface of the human body, and then the carrier 12 of the electrode array 10 is connected to the intermediate layer 20.

By putting a large number of electrodes 11 in place, a large amount of EEG data can be obtained without, for example, the brain of the test subject 1 having to be opened, such that it is also possible, for example, to determine or precisely localize dipoles in the brain of the test subject 1. This is particularly helpful, for example, for determining epilepsy markers in the brain and for in this way localizing regions of the brain for possible surgical treatment.

If a first cover layer 24 and a second cover layer 25 are arranged on the intermediate layer 20 in the starting state, the electrically conductive gel can also be introduced into the recesses 21 or cavities 210 during the process of manufacturing the intermediate layer 20 and can be enclosed with the cover layers 24, 25 so that subsequent introduction is not necessary. In this case, a further cover layer can be arranged over the first cover layer 24, which further cover layer prevents the gel from running out of the recesses 21 or the cavities 210.

After use, the intermediate layer 20 can be detached from the electrode array 10 or from the flexible carrier 12, and the electrode array 10 can be cleaned so that it can then be reused. In the exemplary embodiment in FIG. 2, the electrode arrangement 100 advantageously comprises an amplifier arrangement 30 to which the electrodes 11 are connected. The amplifier arrangement 30 is arranged on the carrier 12 and is arranged, for example, at a distance of less than 100 mm, in particular less than 10 mm, from the nearest electrode 11 of the electrode array 10, as is shown in FIG. 2. In the present exemplary embodiment, this distance is approximately 5 mm. Since, in the case of electrodes 11 with a small surface area, the impedance is comparatively high and this can affect the measured value, an amplifier arrangement 30, arranged on the carrier 12, is particularly advantageous, since in this way such disturbances are avoided.

Optionally, the electrode arrangement 100 can also comprise a retaining layer arranged between the elastic intermediate layer 20 and the electrodes 11 of the electrode array 10. Such a retaining layer has a smaller cross-sectional area than the elastic intermediate layer 20. In this way it is ensured that, for example, a sufficiently large region of the second adhesive surface 23 remains free and the intermediate layer 20 can be reliably connected or glued to the carrier 12 of the electrode array 10.

The retaining layer has contact openings which have a smaller cross-sectional area than the recesses 21 of the intermediate layer 20, such that, on the one hand, electrically conductive gel located in the cavities 210 is retained and does not leak.

On the other hand, an electrically conductive connection between the electrodes 11 and the cavities 210 or the electrically conductive gel present in the cavities 210 and thus to the body surface of the test subject 1 can be established through the contact openings if the retaining layer is arranged between the intermediate layer 20 and the electrodes array 10 in such a way that the contact openings correspond with the recesses 21 of the intermediate layer 20.

In this context, "correspond" is to be understood as meaning that in each case a part of the cross-sectional area of a recess 21 is congruent with the cross-sectional area of a contact opening such that, for example, electrically conductive gel from the respective cavity 210 contacts the respective electrode 11 through the retaining layer. This can be achieved, for example, when the center points of the cross-sectional areas of the contact opening and of the recess coincide.

Furthermore, the elastic intermediate layer 20 can optionally also be formed without adhesive surfaces 22, 23 or with only one adhesive surface. In this case, the electrode arrangement 100 can be fixed to the body surface of a test subject 1 using self-adhesive medical dressing material, for example. The dressing material is fixed, for example, on the carrier 12 or is stretched across the carrier 12 and affixed to the body surface in question, such that the intermediate layer 20 is also securely fixed to the body surface.

Optionally, an electrode arrangement 100 according to the invention can also comprise a switching unit, which serves to switch between a measurement and a stimulation by means of the electrodes 11. In this way, either a measurement of electrical voltages and currents in the human body can take place or the relevant body surface can be stimulated.

FIG. 3 to FIG. 7 show further exemplary embodiments with possible configurations of an electrode array 10 according to the invention.

Figure 3:
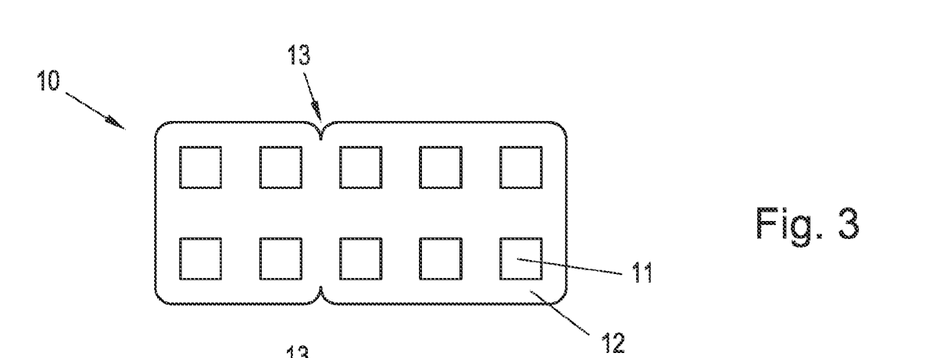
FIG. 3 to FIG. 7 show further exemplary embodiments of electrode arrays according to the invention.

FIG. 3 shows an electrode arrangement 100 in which ten square electrodes 11 are arranged on a carrier 12 in two rows, each of five electrodes 11. Slits 13 are arranged in each row between the second and the third electrode.

Figure 4:
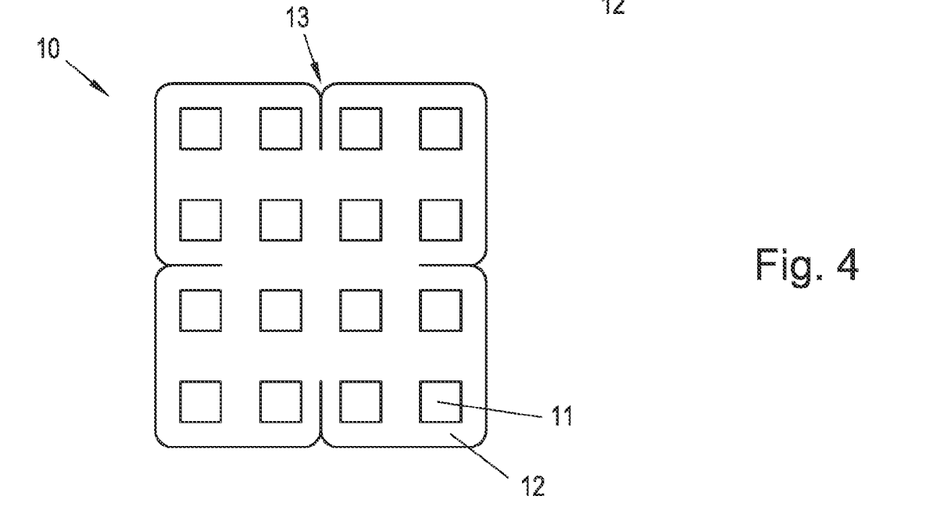

FIG. 4 shows an electrode arrangement 100 in which sixteen square electrodes 11 are arranged on a carrier 12 in four rows, each of four electrodes 11. Slits 13 are arranged at the edge of the carrier 12 between the second and the third electrode.

Figure 5:
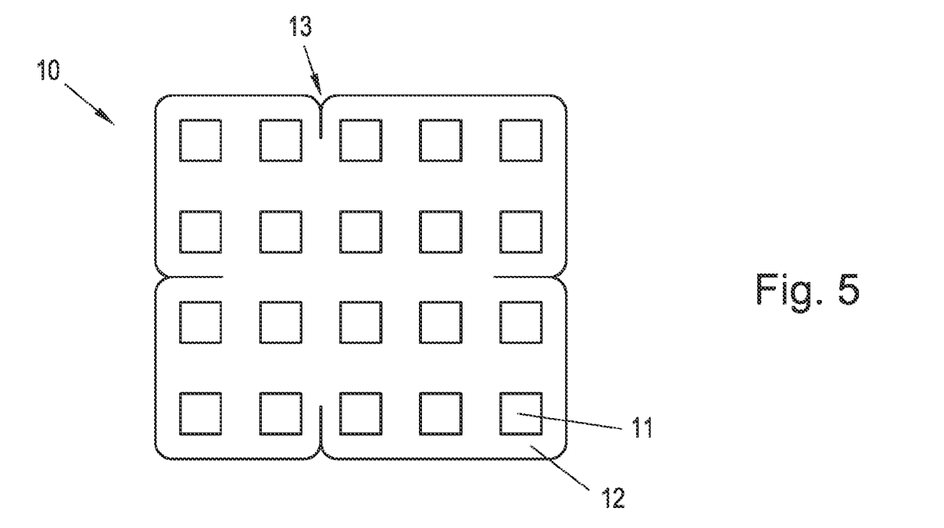
Figure 6:
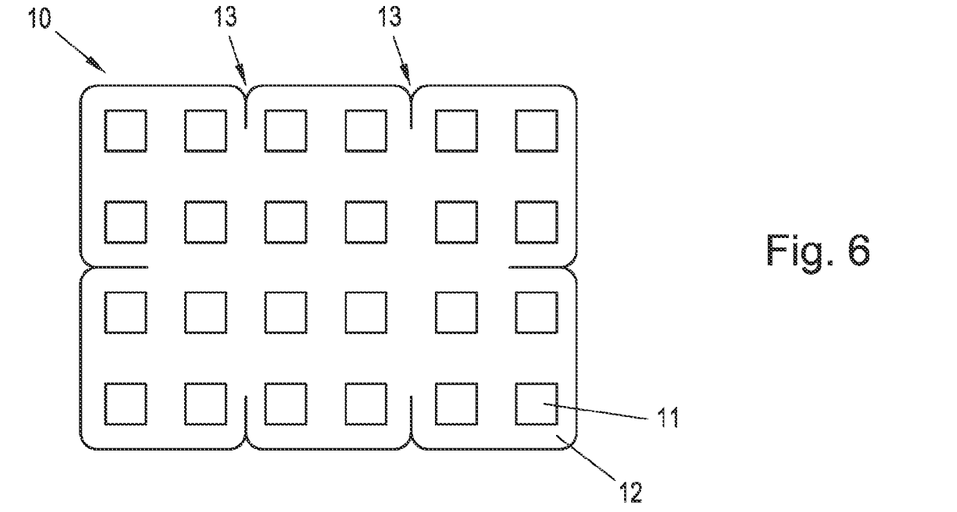

FIGS. 5 and 6 show similar electrode arrangements 100 with twenty square electrodes 11 on a carrier 12 in four rows, each of five electrodes 11, and thirty-two square electrodes 11 on one carrier 12 in four rows, each of eight electrodes 11.

Figure 7:
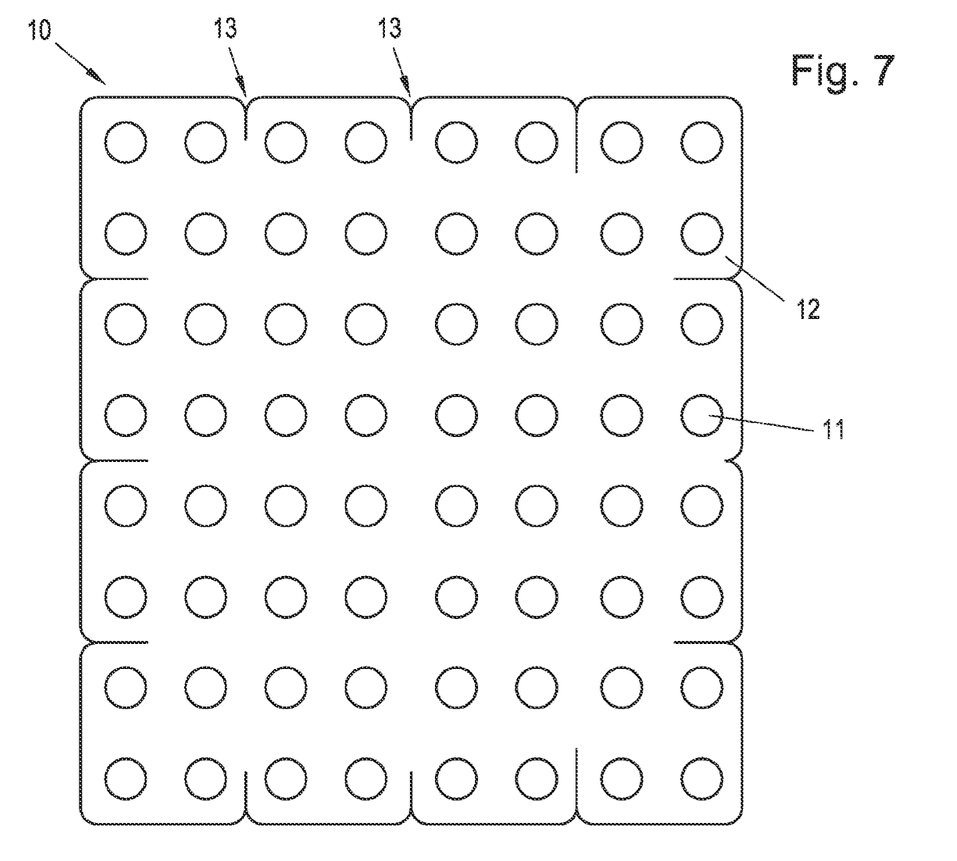

For example, as is shown in FIG. 7, sixty-four electrodes 11 of circular cross section can also be arranged on an 8 by 8 cm carrier 12, in a grid-like formation and distributed equidistantly. In this case, the recesses 21 in the intermediate layer 20 and optionally the openings 26 in the first cover layer 24 can also have a circular cross section. In FIG. 7 there are three slits 13 at each edge of the carrier 12, i.e. in each case after two electrodes 11, which each extend to the outermost row of electrodes 11, as viewed from the edge of the carrier 12. The electrodes 11 in FIG. 7 have a diameter of 4 mm, and the distance from the center of an electrode 11 to the center of a respectively adjacent electrode 11 is 10 mm.

The invention claimed is:

1. An electrode configuration for measuring electrical voltages and currents in a human body and for electrical stimulation of the human body, the electrode configuration comprising:
   an electrode array with a flexible carrier and a plurality of electrodes disposed in a grid-shaped formation on a same side of said flexible carrier, said electrode array having slits formed therein starting from an outer edge of said flexible carrier and being disposed between individual ones of said electrodes;
   an elastic intermediate layer which, for each of said electrodes, has a respective recess formed therein, wherein a cavity for filling with electrically conductive gel is in each case predefined by each said respective recess; and
   a retaining layer disposed between said elastic intermediate layer and said electrodes of said electrode array, said retaining layer having a smaller cross-sectional area than said elastic intermediate layer, said retaining layer having contact openings formed therein, wherein said contact openings have a smaller cross-sectional area than said recesses of said elastic intermediate layer and wherein said contact openings corresponding with said recesses such that an electrically conductive connection is produced between said electrodes and said cavities.

2. The electrode configuration according to claim 1, wherein said elastic intermediate layer has a first adhesive surface for arrangement on a body surface of a test subject and/or a second adhesive surface for arrangement on said flexible carrier of said electrode array.

3. The electrode configuration according to claim 1, wherein said elastic intermediate layer is formed from a flexible electrically insulating material.

4. The electrode configuration according to claim 3, wherein said flexible electrically insulating material is a foamed plastic.

5. The electrode configuration according to claim 1, wherein said electrodes of said electrode array are conductive.

6. The electrode configuration according to claim 5, wherein said electrodes are composed of gold, platinum, or an electrically conductive polymer.

7. The electrode configuration according to claim 1, wherein said flexible carrier of said electrode array is a flexible printed circuit board.

8. The electrode configuration according to claim 1, wherein said electrode array is configured for arrangement on a foot, on a chest and/or on a heart.

9. The electrode configuration according to claim 1, wherein said slits between individual ones of said electrodes of said electrode array are configured in such a way that said electrode array is disposed on a curved body surface.

10. The electrode configuration according to claim 9, wherein said slits between individual ones of said electrodes of said electrode array are configured in such a way that said electrode array is disposed on a head of a test subject.

11. The electrode configuration according to claim 1, further comprising an amplifier configuration disposed on said flexible carrier, wherein said electrodes are connected to said amplifier configuration, and wherein provision is made that said amplifier configuration is disposed at a distance of less than 100 mm from a nearest one of said electrodes of said electrode array.

12. The electrode configuration according to claim 11, wherein said amplifier configuration is disposed at a distance of less than 10 mm from a nearest one of said electrodes of said electrode array.

13. The electrode configuration according to claim 1, further comprising a switching unit connected to said electrode array, said switching unit configured to switch between an electrical stimulation of the human body via said electrodes and a measurement of the electrical voltages and the currents in the human body by means of said electrodes.

14. The electrode configuration according to claim 1, wherein each said cavity being filled with said electrically conductive gel, the electrode configuration is disposed on a body surface of a test subject.

15. The electrode configuration according to claim 1, wherein said elastic intermediate layer is covered by said flexible carrier of said electrode array.

16. The electrode configuration according to claim 15, wherein said elastic intermediate layer is covered by said elastic carrier of said electrode array when the electrode configuration is disposed on a body surface of the test subject.

17. The electrode configuration according to claim 1, wherein said contact openings, when the electrode configuration is disposed on a body surface of a test subject, correspond with said recesses such that the electrically conductive connection is produced between said electrodes and the electrically conductive gel present in said cavities.

18. A method for applying the electrode configuration according to claim 1 to a body surface of the human body, which comprises the steps of:
 a) disposing a second adhesive surface of the elastic intermediate layer on the flexible carrier of the electrode array in such a way that the electrodes correspond with the recesses in the elastic intermediate layer;
 b) applying the electrically conductive gel to that side of the elastic intermediate layer facing away from the flexible carrier of the electrode array, in such a way that the cavities predefined by the recesses are completely filled, and removing excess parts of the electrically conductive gel; and
 c) disposing a first adhesive surface of the elastic intermediate layer on the body surface of the human body.

19. The method according to claim 18, which further comprises carrying out the steps a), b) and c) in a reverse order.

* * * * *